United States Patent
Kayhani et al.

(10) Patent No.: US 10,600,264 B2
(45) Date of Patent: Mar. 24, 2020

(54) TRACKED TICKET VALIDATION AND FEEDBACK SYSTEM

(71) Applicant: Cubic Corporation, San Diego, CA (US)

(72) Inventors: Niosha Kayhani, Sutton (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/033,910

(22) Filed: Jul. 12, 2018

(65) Prior Publication Data

US 2019/0019361 A1    Jan. 17, 2019

Related U.S. Application Data

(60) Provisional application No. 62/531,812, filed on Jul. 12, 2017.

(51) Int. Cl.
*G07C 9/00* (2020.01)
*G07B 15/00* (2011.01)
(Continued)

(52) U.S. Cl.
CPC ..... *G07C 9/00103* (2013.01); *G06K 9/00221* (2013.01); *G06K 9/00369* (2013.01);
(Continued)

(58) Field of Classification Search
CPC . G07C 9/00103; G06K 9/00369; G07B 15/00
See application file for complete search history.

(56) References Cited

U.S. PATENT DOCUMENTS

| | | | |
|---|---|---|---|
| 9,275,535 B1 | 3/2016 | Ho | |
| 2014/0015978 A1* | 1/2014 | Smith | G07B 15/02 348/156 |

(Continued)

FOREIGN PATENT DOCUMENTS

| | | |
|---|---|---|
| EP | 2397995 A1 | 12/2011 |
| WO | 2018037392 A1 | 3/2018 |

OTHER PUBLICATIONS

"Invitation to Pay Additional Fees and Where Applicable, Protest Fee" dated Sep. 24, 2018 in related Application No. PCT/US2018/041816, all pages.

*Primary Examiner* — Nabil H Syed
(74) *Attorney, Agent, or Firm* — Kilpatrick Townsend & Stockton LLP

(57) ABSTRACT

An overhead tracking system for tracking validation events including a plurality of validation devices that wirelessly receive an access token from a fare media device and validate the access token. The system includes an overhead tracking sensor that continuously tracks a position of each of a plurality of users passing underneath the sensor and receives an indication from at least one of the validation devices upon a user having successfully validated the access token from a fare media device associated with the user. The sensor detects when a particular one of the plurality of users has crossed into a feedback zone and sends a command to one or more remote devices based on detecting that the user has crossed into the feedback zone. The command and the remote devices are selected based on whether the user has successfully validated the access token.

10 Claims, 6 Drawing Sheets

(51) Int. Cl.
*G06T 7/80* (2017.01)
*G06T 7/292* (2017.01)
*G06K 9/00* (2006.01)

(52) U.S. Cl.
CPC ................ *G06T 7/292* (2017.01); *G06T 7/80* (2017.01); *G07B 15/00* (2013.01); *G06T 2207/30196* (2013.01); *G06T 2207/30232* (2013.01)

(56) References Cited

U.S. PATENT DOCUMENTS

| | | |
|---|---|---|
| 2014/0104034 A1 | 4/2014 | Ambrefe et al. |
| 2015/0294515 A1* | 10/2015 | Bergdale .............. G06Q 20/045 340/5.61 |
| 2016/0284147 A1* | 9/2016 | Trani ........................ G01S 5/00 |
| 2017/0055157 A1 | 2/2017 | Bergdale et al. |
| 2017/0301160 A1* | 10/2017 | Somani ................... H04W 4/80 |
| 2019/0172281 A1* | 6/2019 | Einberg ................... G06K 9/00 |

* cited by examiner

TRACKED TICKET VALIDATION AND FEEDBACK SYSTEM

CROSS-REFERENCES TO RELATED APPLICATIONS

This application claims the benefit of U.S. Provisional Application No. 62/531,812, entitled "TRACKED TICKET VALIDATION AND FEEDBACK SYSTEM", filed on Jul. 12, 2017, the entire contents of which are hereby incorporated by reference.

BACKGROUND OF THE INVENTION

Setting up transit passenger tracking cameras is normally time consuming and requires accurate calibration based on positioning of the a validation device. In other words, conventional tracking software and systems require manual positioning and calibration of any input device into the software. Precise calibration is necessary to splice images fields of multiple cameras together to create a seamless (and accurate) mapping of a walkway. This calibration can cause considerable time and monetary demands.

BRIEF SUMMARY OF THE INVENTION

Embodiments of the present invention provide systems and methods for initializing and operating an overhead tracking system that can monitor validation events for controlling access to various locations. The embodiments described herein use one or more validation devices. As users validate access credentials, the validation results may be sent to an overhead tracking system, which tracks the location of both validated and unauthorized users to determine whether any further action needs to be taken. For example, properly validated users may be sent a verification notification and/or proper validation may cause an access control device to alter its state, such as moving a gate or other physical barrier to allow the validated user to pass. Unauthorized users may be sent reminders and/or a fare inspector device may be sent an indication that the user has not properly validated and may be committing fare evasion.

In one embodiment, an overhead tracking system for tracking validation events is provided. The system may include a plurality of validation devices. Each of the plurality of validation devices may be configured to wirelessly receive an access token from a fare media device and validate the access token. The system may also include at least one overhead tracking sensor that may be configured to continuously track a position of each of a plurality of users passing underneath the at least one overhead tracking sensor and receive an indication from at least one of the plurality of validation devices upon at least one of the plurality of users having successfully validated the access token from the fare media device associated with the at least one of the plurality of users. The overhead tracking sensors may also be configured to detect when a particular one of the plurality of users has crossed into a feedback zone and send a command to one or more remote devices based on detecting that the particular one of the plurality of users has crossed into the feedback zone. One or both of a type of the command and the one or more remote devices may be selected based on whether the particular one of the plurality of users has successfully validated the access token from the fare media device associated with the particular one of the plurality of users.

In another embodiment, a method of tracking validation events is provided. The method may include continuously tracking, using at least one overhead tracking sensor, a position of each of a plurality of users passing underneath the at least one overhead tracking sensor and receiving an indication from at least one of a plurality of validation devices that at least one of the plurality of users has successfully validated an access token from a fare media device associated with the at least one of the plurality of users. The method may also include detecting when a particular one of the plurality of users has crossed into a feedback zone and sending a command to one or more remote devices based on detecting that the particular one of the plurality of users has crossed into the feedback zone. One or both of a type of the command and the one or more remote devices may be selected based on whether the particular one of the plurality of users has successfully validated the access token from the fare media device associated with the particular one of the plurality of users.

In another embodiment, a method of initializing an overhead tracking system is provided. The method may include emitting, using a plurality of signaling devices, one or more of a predetermined pattern, a predetermined frequency, or a predetermined wavelength of one or both of a light wave or a sound wave. Each of the plurality of signaling devices may be coupled with one of a plurality of validation devices. The method may also include receiving, using at least one overhead tracking sensor of the overhead tracking system, the one of more of the predetermined pattern, the predetermined frequency, or the predetermined wavelength of one or both of the light wave or the sound wave. The at least one tracking sensor may be further configured to track a position of one or more users passing below the at least one overhead tracking sensor. The method may further include determining, by the overhead tracking system, a position of each of the plurality of validation devices relative to the at least one overhead tracking sensor based on the received one of more of the predetermined pattern, the predetermined frequency, or the predetermined wavelength of one or both of the light wave or the sound wave.

BRIEF DESCRIPTION OF THE DRAWINGS

A further understanding of the nature and advantages of various embodiments may be realized by reference to the following figures.

DETAILED DESCRIPTION OF THE INVENTION

Figure 1:
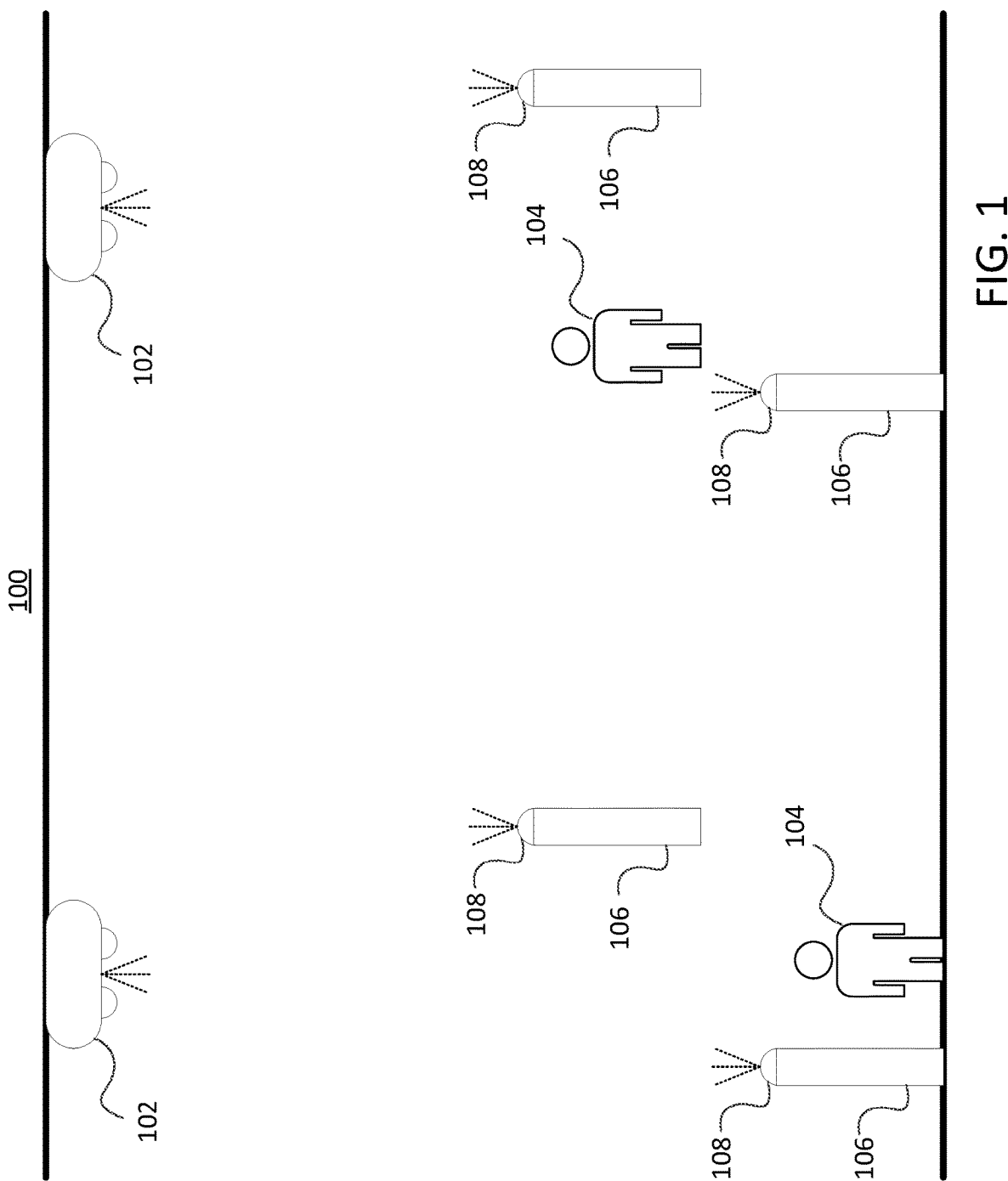
FIG. 1 is a diagram of an overhead tracking system according to embodiments.

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the invention(s) provide systems and methods for determining the validity of access tokens and/or verifying payment of passengers to travel as they validate their travel token and proceed past a point of interest (such as a gateline). The present invention creates the ability to validate a passenger based on a back office interaction and subsequently tag and track passenger movement. This can be done by integrating a tracking application to receive an external command from the back office to signify a valid/invalid payment interaction. The passenger can then be tracked to a point of interest where the feedback system provides targeted feedback based on each passenger's interaction (or lack thereof) with validation devices.

According to embodiments, every user could be tracked, meaning that the feedback system can differentiate between a valid and invalid/non-attempted payment and/or other validation attempt. This feedback system can be designed to be targeted to the individual but it can also link to external systems and provide data on validity statuses of passengers in real-time. In some embodiments, the system may include an 'open walkway', meaning that there are no paddles (or other physical barriers) that actuate (such as by unlocking/locking/opening/closing) based on the validation output. The validation output can come from the back-office and/or directly from the validation device.

Embodiments of the prevent invention provide numerous benefits. For example, embodiments, enable travel token validation and access to secured areas via overhead tracking. The output of the validation is tagged onto some or all of the individual users and feedback is provided as each user crosses into a feedback zone. Embodiments provide the ability to distinguish paid/unpaid passengers in real-time as they travel, as well as the ability to perform automated and advanced revenue protection in mass transit without the requirements of physical paddles on gates. Output devices, such as cameras used for tracking, can now be seamlessly 'spliced' together whereas input devices that aren't part of their system would require time-consuming manual calibration and positioning.

In addition to the linking of the validation system to tracking software, embodiments may further enable the automatic setup and calibration of such a system. For example, the calibration or initialization of the overhead tracking system may be performed using a combination of sensors and signaling devices that enable the various components to communicate with one another to automatically calibrate the system and determine relative positions and/or distances between the components. Such systems and methods provide several benefits. For example, a novel setup procedure of output systems in a tracking application is provided that enables automatic self-calibration of other wireless systems, thus saving significant time and manpower, as well as eliminating the human error element.

While embodiments of the invention(s) described herein are generally related to ticket validation in transit systems, it will be appreciated that embodiments and applications are not so limited. For instance, embodiments may support a payment system that requires quick and accurate authentication and is restricted by the size of its database entries (such as biometric payment systems).

Turning now to FIG. 1, a diagram of an overhead tracking system 100 is shown. Overhead tracking system 100 includes at least one overhead tracking sensor 102. Each overhead tracking sensor 102 may be an optical imager, such as a still and/or video camera, an infrared (IR) sensor, and/or other tracking sensors. The overhead tracking sensors 102 may be mounted on a ceiling, wall, post, and/or other elevated structure. The overhead tracking sensors 102 may be positioned in an arrangement that covers all or a significant portion of an area of interest, such as a walkway, bus or train terminal or other transit station. Each of the overhead tracking sensors 102 may be configured to continuously track the positions of each of a number of users 104 that are passing on a walkway underneath and within a detection range of the overhead tracking sensors 102. The overhead tracking sensors 102 are arranged such that they may detect one or more validation devices 106 that are positioned on and/or otherwise accessible from the walkway underneath and within a detection range of the overhead tracking sensors 102.

One or more validation devices 106 (such as kiosks, posts, and/or other wireless communications devices) may be spaced apart along the walkway and provide locations for users 104 to validate access tokens (such as monthly passes, stored value cards, regional passes, transit accounts, and the like) and/or other access credentials that are stored on a fare media device of the user 104. For example, the fare media device may be a smartcard, a fob, a magnetic stripe card, mobile phone, and/or other wireless device. The fare media device may wirelessly communicate the access token to the validation device 106 using one or more wireless means. For example, each validation device 106 a magnetic reader, near field communication (NFC) reader, Bluetooth™ and/or Bluetooth™ Low Energy (BLE) reader, and/or other radio or wireless reader to receive the access tokens from a fare media device.

In some embodiments, an automatic setup procedure may be performed to initialize the validation devices 106 of the overhead tracking system 100. For example, in some embodiments, wireless and directionalized signals, (e.g., a light and/or sound pattern output by the validation device 106 and/or other signaling device 108) are received and interpreted by the tracking sensor software and/or an additional (temporary) camera and/or other sensor alongside the tracking sensor 102. As just one example, a signaling device 108 may be coupled with each of the validation devices 106. The signaling devices 108 may be configured to emit light and/or sound wave signals having a known, predetermined pattern, frequency, and/or wavelength. These signals may be received and recognized by the tracking sensors 102 and/or additional temporary sensor. For example, the signaling devices 108 may emit a light wave, such as by using a light emitting diode (LED), using a repeating pattern of flashes. The tracking sensors 102 may detect the flashing light and identify the source as being a signaling device 108 based on the pattern of the flashing light. Once the validation device 106 is identified, the overhead tracking system 100 may determine a position of the validation device 106 relative to the tracking sensor(s) 102. For example, a direction from which the signal was received by the tracking sensor(s) 102 may be used to determine a directional relationship between the components. The distance between the components may be determined using several different techniques. For example, in some embodiments, each signal may be emitted having a known signal strength. Upon receiving each signal, the tracking sensor 102 may determine a received signal strength of each signal. By comparing the known emitted signal strength with the received signal strength, the overhead tracking system 100 may calculate a distance between the validation device 106 and the tacking sensors 102. In other embodiments, a light source of the signaling device 108 may have a known light emission size. Comparing this known size to the size of the received light as perceived by the tracking sensor 102 may yield a distance between the components. Using the combination of directional relationship and distance between the validation devices 106 and the tracking sensors 102, a mapping of the components on or around a walkway may be generated. This process may be repeated for signaling devices 108 coupled with each of the validation devices 106, with the calibration or initialization of each signaling device 108 occurring sequentially and/or concurrently with one another. The processing performed by the overhead tracking system 100 may be performed by processing hardware and software of each of the tracking sensors 102 and/or may be performed at a separate processing module (not shown) of the overhead tracking system 100.

In some embodiments, the signal emitted from each of the signaling devices 108 may have its own signature, allowing the overhead tracking system 100 to discern which particular validation device 106 the signal is representative of. For example, a signaling device 108 coupled with a first one of the validation devices 106 may emit red light that flashes in a repeating pattern of two short pulses, while a signaling device 108 coupled with a second one of the validation devices 106 may emit green light that flashes in a repeating pattern of three long pulses. It will be appreciated that any variation in pattern, wavelength, frequency, and/or sound and/or light source may be used as signatures to distinguish between signaling devices 108 coupled with each of the validation devices 106. The signaling devices 108 may be integral components of the validation devices 106 or may be detachable components. If detachable, the signaling devices 108 may be reused in numerous initialization processes by coupling a signaling device 108 to a validation device 106 in one overhead tracking system 100, performing the initialization procedure, removing the signaling devices 108 from the validation devices 106, and then later repeating these steps for initializing a different overhead tracking system 100.

In some embodiments, the overhead tracking sensor(s) 102 may also be used to detect a feedback zone of an overhead tracking system 100. For example, the feedback zone may be marked by one or more additional signaling devices having their own unique signature (not shown) and/or by an object, such as a line, symbol, structure, shape, color, and/or other marking tool placed at an outer boundary of the feedback zone. If additional signaling devices are used, the tracking sensor(s) may determine the location of the feedback zone in a similar manner as done for the validation devices 106. If other marking tools are used, the tracking sensors 102 may determine the position of the feedback zone based on the position of the marking tool. In some embodiments, a size of each marking tool may be known such that a perceived size of the marking tool at a particular tracking sensor 102 may be used to determine a distance between the two objects.

Figure 2:
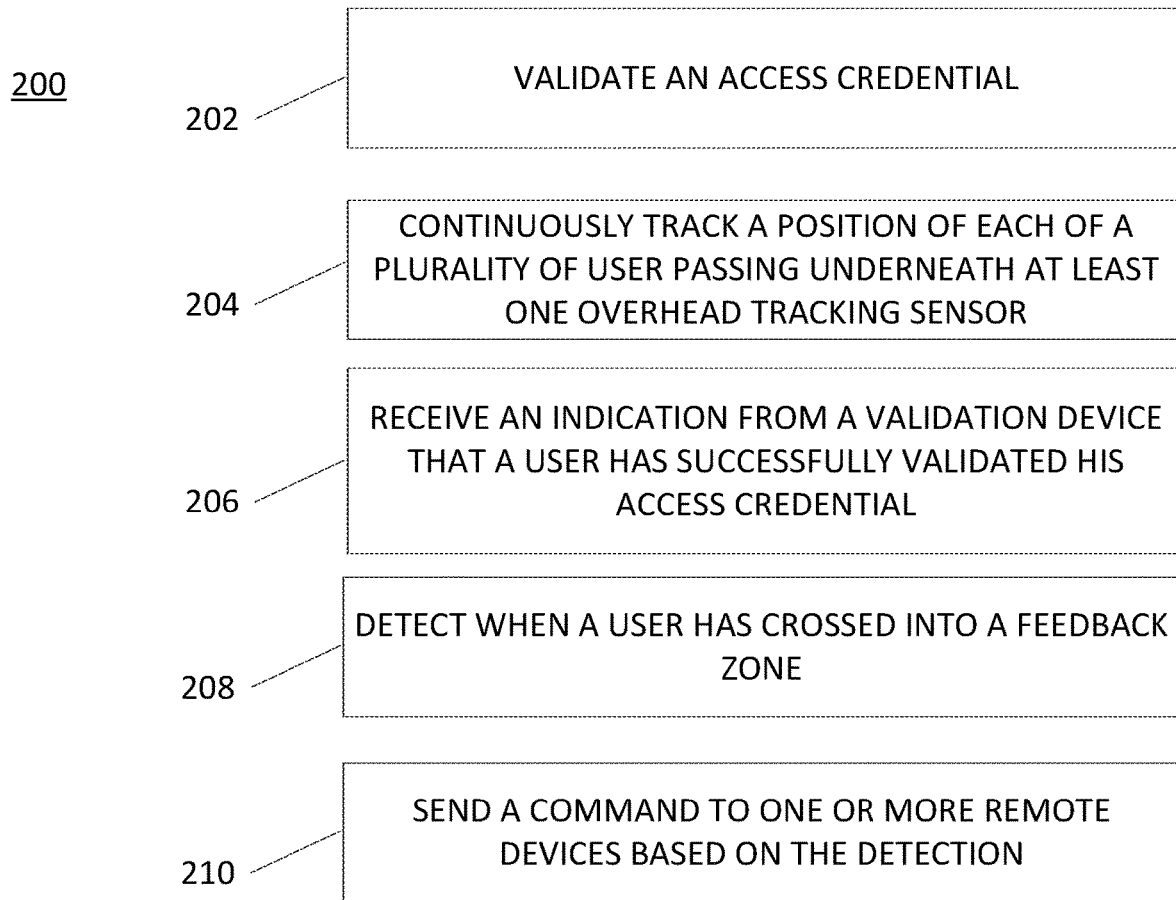
FIG. 2 is a flowchart depicting a process for initializing an overhead tracking system according to embodiments.

FIG. 2 is a flowchart depicting a process 200 for initializing an overhead tracking system, such as overhead tracking system 100. Process 200 may begin at block 202 by emitting, using a plurality of signaling devices (such as signaling devices 108), a predetermined pattern, a predetermined frequency, and/or a predetermined wavelength of a light wave and/or a sound wave and/or series of waves. In some embodiments, each of the signaling devices is coupled with a respective validation device, such as validation device 106. The signaling device may be part of the validation device or may be removably coupled with the validation device. For example, the signaling device may be clipped onto and/or otherwise secured to the validation device using mechanical fasteners, adhesives, magnets, and/or other temporary fastening techniques. This allows the signaling devices to be reused in additional initialization procedures.

At block 204, the light and/or sound wave may be received from the signaling device(s) by at least one overhead tracking sensor of the overhead tracking system, such as overhead tracking sensor 102. This tracking sensor not only is used to calibrate the overhead tracking system, but also serves as a tracking sensor (such as a camera) that tracks a position of one or more users passing below the at least one overhead tracking sensor when the tracking system is operational. Based on the received light and/or sound wave, the overhead tracking system may determine a position of each of the validation devices relative to overhead tracking sensors. For example, the signaling devices may emit a sound wave at a particular frequency. The tracking sensors may detect the sound wave and identify the source as being a particular signaling device based on the frequency of the sound wave. Once the validation device is identified, the overhead tracking system may determine a position of the validation device relative to the tracking sensor(s) at block 206. For example, a combination of the direction from which the signal was received by the tracking sensor(s) may be used to determine a directional relationship between the components. The distance between the components may be determined by comparing a known emitted signal strength with a received signal strength and/or (in light wave embodiments) by comparing known light emission size to a size of received light as perceived by the tracking sensor. Using the combination of directional relationship and distance between the validation devices and the tracking sensors, a mapping of the components on or around a walkway may be generated. It will be appreciated that other distance, directional relationship, and/or relative position measuring techniques may be performed in accordance with the present invention. In some embodiments, the signal emitted from each of the signaling devices may have its own signature. This allows the overhead tracking system to discern which particular validation device the signal is representative of.

In some embodiments, process 200 involves detecting a feedback zone of the overhead tracking system. The feedback zone may be an area in which the overhead tracking system transmits a signal to one or more remote devices based on a validation determination. For example, the feedback zone may be positioned such that once a user crosses into it, the overhead tracking system can assume that the user has no intention of attempting validation (or re-attempting if the user has already attempted to validate an access token). As just one example, this may be an area that is secure and/or near the transit vehicle boarding area. Detecting the feedback zone may involve of detecting, using the at least one overhead tracking sensor, a signal from at least one additional signaling device that is positioned at an outer boundary of the feedback zone and/or detecting, using the at least one overhead tracking sensor, a predefined object, such as a marking tool, that marks the outer boundary of the feedback zone.

Such installation techniques allow input devices such as the validator to automatically calibrate itself with the tracking system using various existing sensor technologies such LED and BLE sensor devices, thereby enabling a seamless installation of new tracking sensors 102 and/or validation devices 106 using minimal user input.

Once initialized for use, the overhead tracking system 100 may be used to monitor validation events and track users as they move along a walkway or terminus. For example, the overhead tracking system may utilize tag and trace techniques to monitor users based on the position relative to the validation device 106, with the tag being determined from the output of the validation device 106. As just one particular example, the overhead tracking sensors 102 may receive output data from the validation devices 106 that indicate whether each user has successfully validated an access token, such as a token stored on a fare media device (such as a smartcard, token device, mobile phone, tablet, and/or other mobile communications device) of the user and/or a token associated with a user identified by biometric (i.e. fingerprint, facial recognition, etc.) or other identification techniques. The users may then be tagged with an indication of successful validation or failed/no validation. The users' movements may be tracked and upon entering a feedback zone, the overhead tracking system 100 may send commands to one or more remote devices based on whether a particular tracked user has successfully validated their access token.

Figure 3:
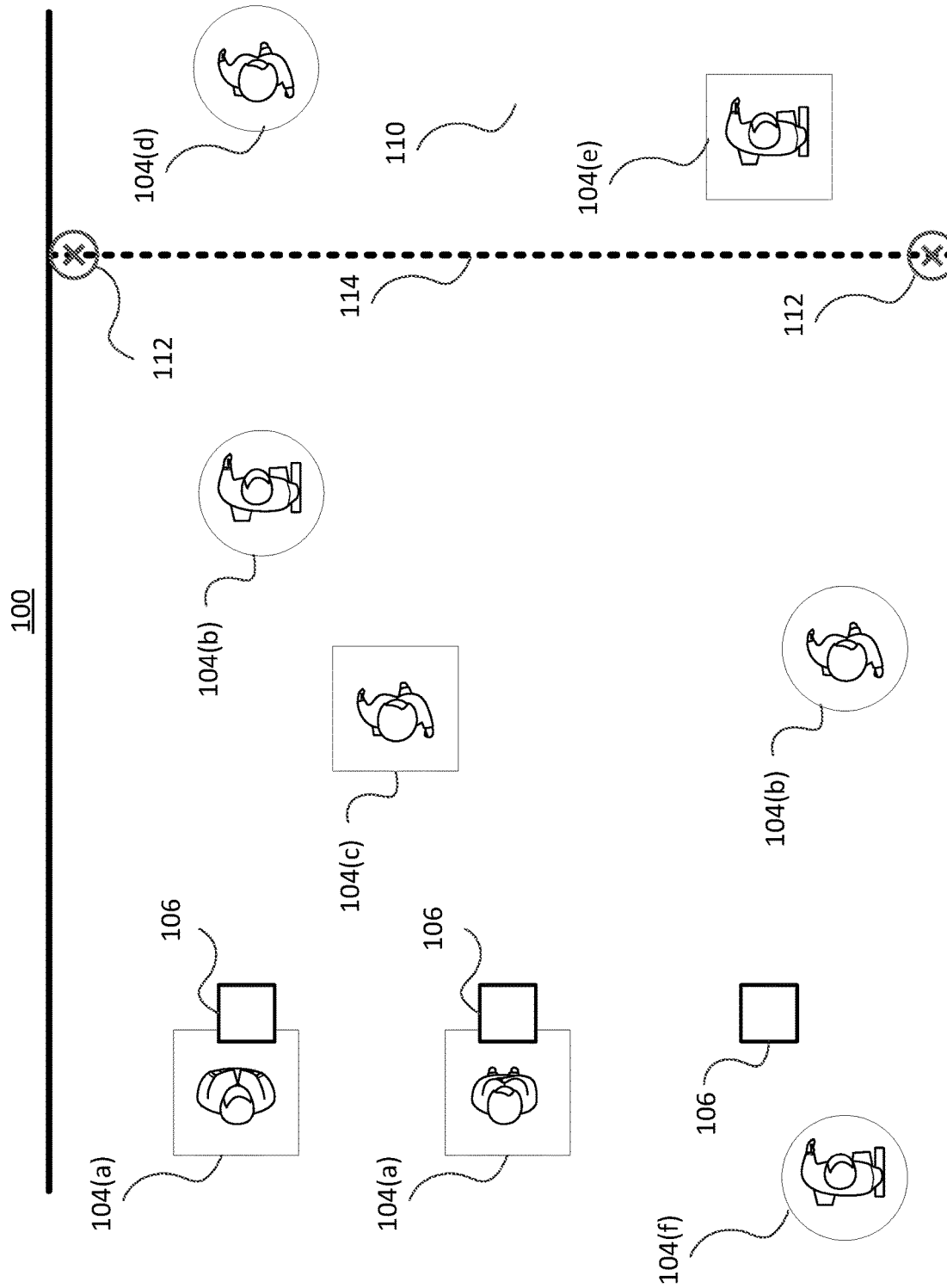
FIG. 3 is a top view of the overhead tracking system of FIG. 1.

FIG. 3 is a top view of overhead tracking system 100. Users 104 may validate their travel token on a validation device 106, which may be linked to a station computer (not shown) and/or a ticketing back-office (not shown) to check for validity and communicate a message regarding a result of the validation attempt to the interface of the validation device 106 and/or user device. Once a user 104 has been successfully validated, the overhead tracking system 100 may tag the validated user 104 as being successfully validated. For example, in FIG. 3 successfully validated users 104 are shown with circular borders extending around them, while users that have not been successfully validated are depicted with square borders. It will be appreciated, that the use of borders is only meant as an example, and that the overhead tracking system 100 may tag users in any manner possible, oftentimes with merely a data string or bit written into tracking data, as there may not be any visual representation of the tracked users 104. Moreover, in some embodiments, all users 104 will include a tag, while in other embodiments, only successfully validated users 104 or unsuccessfully/non-validated users 104 may be tagged. Such embodiments may reduce memory, processing, and/or bandwidth requirements associated with the overhead tracking system 100.

Here, users 104, such as users 104(a), may be getting validated at the validation devices 106. This may be done by presenting a fare media device, such as a smartcard or mobile device, to the validation device 106 such that an access token is wirelessly transmitted to the validation device 106. The validation device 106 may either locally validate the token or may communicate with a back office or other payment system to validate the token. Upon validation, the validation device 106 and/or the back office may communicate an indication of the result to the sensors 102 of the overhead tracking system 100. A similar indication may also be displayed to the user by the validation device 106 and/or the user's fare media device, such as by using email, push notifications, short message service (SMS) messages, in-app messages on a mobile application or website, and the like. The overhead tracking system 100 and/or sensors 102 may then tag the validated user 104 with the result of the validation. For example, users 104(b) have been successfully validated and have passed beyond the validation devices 106, while user 104(c) has passed the validation devices 106 but has not been successfully validated (such as due to failed validation or failure to attempt to validate).

Each of the users 104 may be tracked before and/or after approaching the validation devices 106. The overhead tracking system may then detect when each user 104 has passed into a feedback zone 110. Feedback zone 110 may be an area in which the overhead tracking system 100 transmits a signal to one or more remote devices (not shown) based on a validation determination. The feedback zone 104 may be defined by one or more marking tools or sensors. For example, additional signaling devices 112 may be positioned at an outer boundary 114 of the feedback zone 110 to define the boundary of the feedback zone 110.

As each user 104 crosses into the feedback zone 110, the overhead tracking system 100 may determine, based on the tags, whether the user 104 has been successfully validated, and based on this result, may send a command to one or more remote devices. For example, user 104(d) has passed into the feedback zone 110 and has been successfully validated. In such instances, the user 104(d) may be sent an indication that she is free to continue and board a vehicle, such as by using email, push notifications, short message service (SMS) messages, in-app messages on a mobile application or website, and the like. In some embodiments, alternatively and/or additionally, a command indicating that user 104(d) has been successfully validated may be sent to one or more access control devices (not shown), which may then change a physical state of one or more components of the access control device based on this command. For example, the access control device may be a physical gate, turnstile, and/or other barrier. The command may cause the barrier, such as a gate, paddles, and/or other physical obstruction to be unlocked and/or moved out of the way so as not to obstruct the user 104(d) to permit the user 104(d) access to a controlled area. In other embodiments, the access control device may include a display, lights, and/or speaker. The command may cause one of these components to produce an audio and/or visual indication that the user 104(d) is permitted to continue. In some embodiments, the command to the access control device may be triggered upon the overhead tracking system 100 determining that the user 104(d) is within a threshold distance of the access control device. This ensures that the access control device is actuated only by approaching authorized users.

User 104(e) has passed into the feedback zone 110 and has not been successfully validated. In such instances, the user 104(e) may be sent an indication that has not been successfully validated and may be reminded to return to a validation device 106 to successfully validate, such as by using email, push notifications, short message service (SMS) messages, in-app messages on a mobile application or website, and the like. In some embodiments, alternatively and/or additionally, a command indicating that user 104(e) has not been successfully validated may be sent to one or more access control devices, which may then change a physical state of one or more components of the access control device based on this command. For example, a gate or other barrier may be locked and/or moved into a position to obstruct the movement of user 104(e). In some embodiments, a light or sound may be emitted to alert the user 104(e) that he is not free to proceed. In some embodiments, a command may be sent to one or more authorities, such as a fare inspector device (not shown), the back office, the police, and/or other enforcement agency. The command may include an indication that the user 104(e) is in the feedback zone 110 without proper authorization and may be acted upon accordingly by the enforcement agency. In some embodiments, the indication may include a time and location of the event, details about any validation attempts (i.e. failed attempt vs. no attempt at validation), identification information associated with the user 104(*e*) (which may include video and/or still images of the user(e) for identification purposes), and/or other information that may help the enforcement agency track down the user 104(*e*).

In some embodiments, users 104 may be able to be validated without approaching a validation device 106. For example, user 104(*f*) has been validated prior to reaching the validation devices 106. This may be done using longer range credential validation, using BLE and/or other longer range wireless protocols, with the user's token being automatically pushed to the transit system via a mobile application or website upon entering a detection range of a validation device 106. The validation may also be performed using facial recognition or other identity verification processes that do not require the user approaching a validation device 106. For example, the overhead tracking sensors 102 may be configured to perform facial recognition on users 104 that are far enough away that the imaging angle allows for the accurate identification of facial features. Once identified, the overhead tracking system 100 may query the back office to determine if the identified user 104 is associated with a valid access token. Using such technology allows a more seamless experience for the users 104 and increases throughput as fewer (or no) users 104 need to approach validation devices 106. In some embodiments, the facial recognition system may be used to further enhance the tracking abilities of the overhead tracking system 100, as tracked movement of users 104 may be compared with facial data taken of each user 104 at various positions on the walkway to verify the two identification techniques are operating consistently with one another. It will be appreciated that in some embodiments, the facial recognition system may be integrated into the validation devices 106 instead of, or in addition to, the overhead tracking sensors 102.

It will be appreciated that the processing abilities (user tracking, tagging, determining command destination and content, etc.) may be performed using the tracking sensors 102 and/or separate processing modules of the overhead tracking system 100. For example, one or more processing units may be included that are specially designed to perform the various functions of the overhead tracking system 100, components thereof, and/or equipment that interfaces with the overhead tracking system 100.

Figure 4:
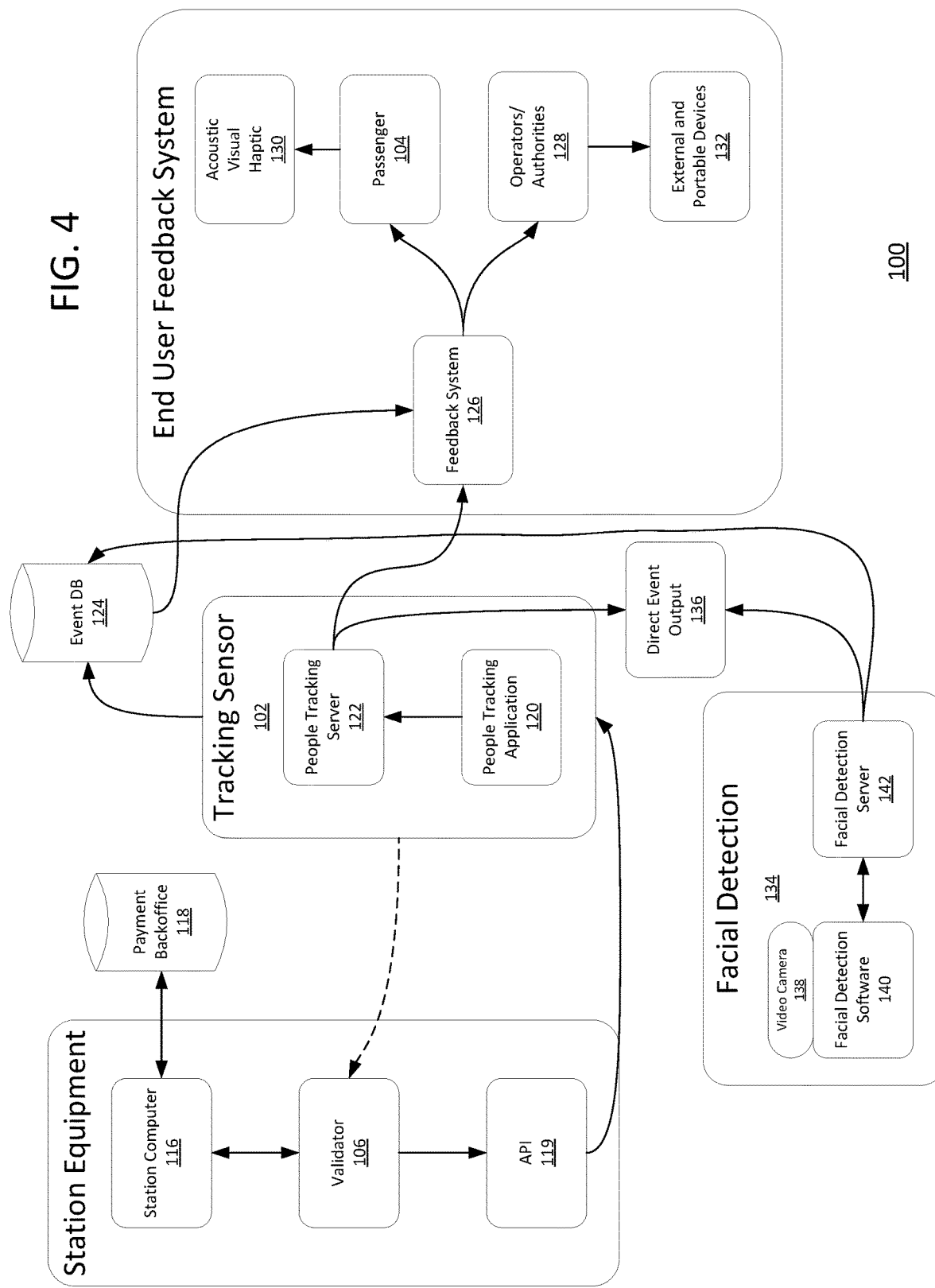
FIG. 4 is a system diagram of the overhead tracking system of FIG. 1.

FIG. 4 is a system diagram of an embodiment of the overhead tracking system 100. The system 100 starts with a user validating their travel token on a validation device 106 which is linked to a station computer 116 and a ticketing back-office 118 to check for validity (such as by checking the validity of a pass or balance of a stored value account and/or other transit account associated with the user and/or the fare media device presented to the validation device 106) and to relay a validation result message to an interface of the validation device 106 and/or user device. The result of the validation may also be communicated to the overhead tracking sensors 102. For example, the system 100 may link the validation device 106 to the overhead tracking sensors 102 via an application programming interface (API) 119 that enables data to be shared between the two systems. The overhead tracking sensors 102 may operate using a people tracking application 120 that analyzes a video feed (or other sensor data) to identify and track users passing under the one or more tracking sensors 102. The overhead tracking sensors 102 may use the validation results provided by the validation device(s) 106 to tag tracked users as being validated and/or not validated.

The overhead tracking sensors 102 may also include and/or otherwise be in communication with a tracking server 122. Tracking server 122 can be linked to an event-driven database 124 and/or a feedback system 126 (which includes various feedback mechanisms for different end-users) and may communicate information related to the tracking of users to the event-driven database 124 and/or the feedback system 126. For example, tags and/or locations of each tracked user may be sent to the event-driven database 124 and/or the feedback system 126 and/or the tags and/or locations of each tracked user may trigger the sending of various commands to the feedback system 126. Oftentimes, these commands or other data are sent upon the overhead tracking system 100 determining that the user 104 has entered a feedback zone. For example, for successfully validated users, the feedback system 126 may receive a command to send a notification to the passenger 104 (such as to a mobile device of the passenger 104, which may also serve as the fare media device in some embodiments) alerting the passenger 104 that they may proceed using acoustic, visual, and/or haptic indicators (such as mobile phone vibration) 130. Additionally or alternatively, the feedback system 126 may be instructed to send a command to an operator/authority 128, which may cause a command to be sent to an external and/or portable device 132 (such as an access control device). For example, the command may cause the access control device to unlock and/or move a physical barrier and/or produce an audio and/or visual indication that the passenger 104 is permitted to access a controlled area. As another example, for non-validated users, the feedback system 126 may receive a command to send a notification to the passenger 104 (such as to a mobile device of the passenger 104, which may also serve as the fare media device in some embodiments) alerting the passenger 104 that they cannot proceed and that they need to visit a validation device 106. Additionally or alternatively, the feedback system 126 may be instructed to send a command to the operator/authority 128, which may cause a command to be sent to an external and/or portable device 132 (such as an access control device, enforcement computer, and/or portable fare inspector device). For example, the command may cause the access control device to lock and/or move a physical barrier and/or produce an audio and/or visual indication that the passenger 104 is not permitted to access a controlled area. Similarly, an indication may be sent to a fare inspector device (or other device of an enforcement agency) that alerts the agency that the user 104 is not validated and is in a feedback zone such that the agency may determine what action to take.

Additionally, system 100 may include a facial recognition system 134 that may be used and may feed into the event-driven database 124 and/or a web page 136. Facial recognition system 134 may be used for analytics and to link tracking with biometric systems. By combining tracking applications with existing payment and ticketing solutions (automated fare collection systems) targeted feedback can be provided to passengers 104 that did not validate their payment token, and relevant authorities may be alerted at substantially the same time. The system may not rely on biometrics or even knowing the individual patron. The system may instead determine the validity of the person based solely on the type of travel ticket they present at a specially equipped validation device 106 (such as a contactless card terminal). The facial recognition system 134 may include one or more video cameras 138 that may capture images of users' faces, which may be analyzed by facial recognition software 140 and matched with a database of known users 104 accessible by a facial recognition server 142 Cameras 138 may be standalone sensors and/or may be integrated into existing devices, such as the overhead tracking sensors 102 and/or the validation devices 106. For example, in some embodiments, validation devices 106 may be equipped with a facial detection camera 138 that could (potentially) differentiate passengers 104 with child/old age pension (OAP) concession tickets (or other tickets that are only valid for passengers 104 meeting certain criteria related to age, physical traits, and/or other characteristics of the passenger 104). It will be appreciated that system 100 may include one or more other biometric systems (such as fingerprint identification systems) that may be used for validation and/or tracking purposes.

Overhead tracking system 100 may include any combination of some or all of the devices shown in FIG. 4. For example, the system 100 may include the station computer 116, back-office 118, validation devices 106, overhead tracking sensors 102, facial detection system 134, and feedback 126. In other embodiments, system 100 may only include the validation devices 106, overhead tracking sensors 102, and feedback system 126, while the remaining devices are operated independently. In yet other embodiments, the overhead tracking system 100 may refer just to the overhead tracking sensors 102 and corresponding components.

Figure 5:
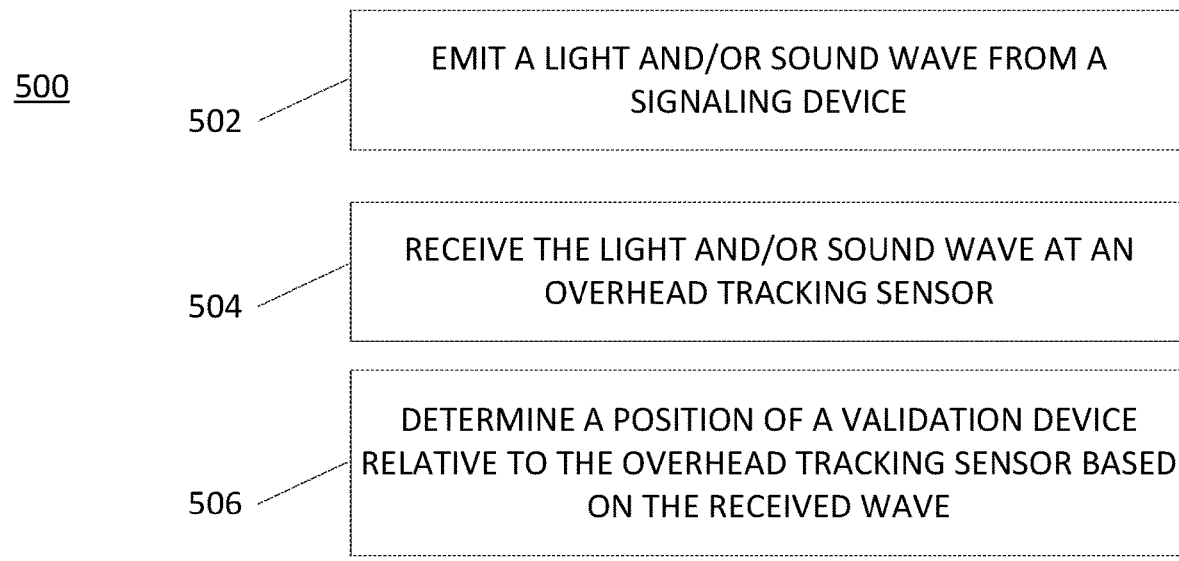
FIG. 5 is a flowchart depicting a process of tracking validation events according to embodiments.

FIG. 5 is a flowchart depicting a process 500 for tracking validation events. Process 500 may include any of the components and devices described herein, including overhead tracking system 100. Process 500 may begin at block 502 by validating an access token from a fare media device of a user. This may involve receiving the access token at a validation device, such as validation device 106. At block 504, a position of each of a plurality of users may be continuously tracked using at least one overhead tracking sensor (such as cameras) as they pass underneath the overhead tracking sensors. An indication may be received from at least one validation device that at least one of the users has successfully validated an access token from a fare media device associated with the user at block 506. At block 508, the overhead tracking system may detect when a particular one of the plurality of users has crossed into a feedback zone. Based on this detection, a command may be sent to one or more remote devices. A type of the command and/or the one or more remote devices may be selected based on whether the particular user has successfully validated the access token from the fare media device associated with the particular user.

For example, the remote device may include a mobile device of the particular user and the command may include an indication that the particular user has successfully validated the access token from the fare media device associated with the particular user. In some embodiments, the remote device may include a fare access device and the command may causes at least one component of the fare access device to change a physical state based on the particular user having successfully validated the access token from the fare media device associated with the particular user. As another example, when the user has not been successfully validated the remote device may be a mobile device of the user and the command may include a reminder to validate the access token from the fare media device associated with the particular user and is selected based on the particular user not having validated the access token from the fare media device associated with the particular user. In some embodiments, the remote device may be a fare inspector device and the command may include an indication that the particular user has not successfully validated the access token from the fare media device associated with the particular user.

In some embodiments, process 500 may include determining the identity of an imaged user using a facial recognition system and determining whether the imaged user is associated with a valid access credential such that the imaged user does not need to carry a fare media device. This enables the user to utilize his own identity as an access credential, eliminating the need to carry a separate fare media device. In some embodiments, the process 500 may further include determining that the particular user has physical characteristics that are consistent with those needed for a particular access credential category.

In some embodiments, the overhead tracking system may need to be initialized prior to entering an operational state. Initializing the at least one overhead tracking sensor and the plurality of validation devices may be done by emitting a predetermined light and/or sound signal from a number of signalizing devices. Each signaling devices may be coupled with one of the validation devices. The overhead tracking sensors may receive the predetermined light and/or sound signal and the overhead tracking system may determine a position of each of the validation devices relative to the at least one overhead tracking sensor based on the received predetermined light and/or sound signal. For example, a distance and direction of each validation device may be determined in a manner similar to as disclosed in FIGS. 1 and 2.

Figure 6:
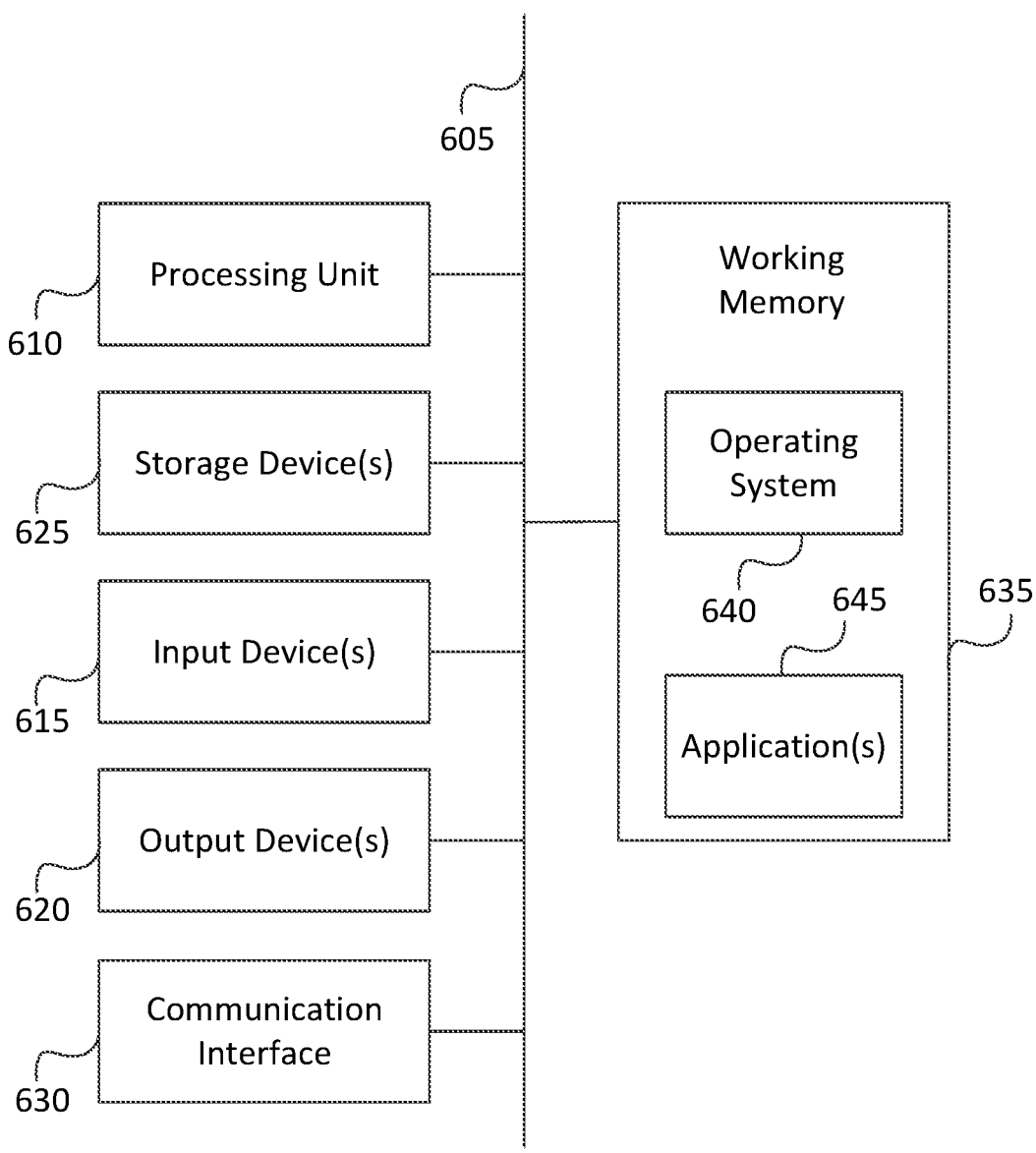
FIG. 6 is a block diagram of a computing system according to embodiments.

A computer system as illustrated in FIG. 6 may be incorporated as part of the previously described computerized devices. For example, computer system 600 can represent some of the components of the overhead tracking system 100, overhead tracking sensors 102, validation devices 106, signaling devices 108, and the like described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, a camera, a smartcard reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An overhead tracking system for tracking validation events, the system comprising:
   a plurality of validation devices, wherein each of the plurality of validation devices is configured to:
      wirelessly receive an access token from a plurality of fare media devices; and
      attempt to validate each access token;
   a facial recognition system that is configured to:
      capture an image of a user associated with a specific access token having certain physical criteria associated therewith; and
      determine that the user associated with the specific access token does not have physical characteristics matching the physical criteria based on the captured image; and
   at least one overhead tracking sensor that is configured to:
      detect a location of a feedback zone by detecting one or both of a predefined light signal or a predefined audio signal emitted by one or more signaling devices positioned proximate a boundary of the feedback zone;
      continuously track a position of each of a plurality of users associated with the plurality of fare media devices passing underneath the at least one overhead tracking sensor;
      receive an indication from at least one of the plurality of validation devices upon at least one of the plurality of users having successfully validated the access token from the fare media device associated with the at least one of the plurality of users;
      detect when a particular one of the plurality of users has crossed into the feedback zone, wherein the particular one of the plurality of users has attempted to validate using a mobile device associated with the particular one of the plurality of users, wherein the mobile device is used as the fare media device to provide a particular access token associated with the particular one of the plurality of users to one of the plurality of validation devices;

send a command to one or more remote devices based on detecting that the particular one of the plurality of users has crossed into the feedback zone, wherein one or both of a type of the command and the one or more remote devices are selected based on whether the particular one of the plurality of users has successfully validated the access token from the fare media device associated with the particular one of the plurality of users, wherein the one or more remote devices comprises the mobile device, and wherein the command comprises an indication that the particular one of the plurality of users has successfully validated the access token from the mobile device; and send a command to a mobile device of the user associated with the specific access token that the user associated with the specific access token has not been successfully validated based on the determination that the user associated with the specific access token does not physical characteristics matching the physical criteria associated with the specific access token.

2. The overhead tracking system for tracking validation events of claim 1, wherein:
the facial recognition system is further configured to operate in conjunction with the at least one overhead tracking sensor to increase the accuracy of the continuous tracking of the position of at least some of the plurality of users.

3. The overhead tracking system for tracking validation events of claim 1, wherein:
the at least one overhead tracking sensor is configured to detect when an additional one of the plurality of users has crossed into a feedback zone, wherein the additional one of the plurality of users has attempted to validate using an additional mobile device associated with the additional one of the plurality of users, wherein the additional mobile device is used as the fare media device associated with the additional one of the plurality of users to provide an additional access token associated with the additional one of the plurality of users to one of the plurality of validation devices;
the one or more remote devices comprises the additional mobile device of the additional one of the plurality of users; and
the command comprises a reminder to validate the access token from the additional mobile device and is selected based on the additional one of the plurality of users not having successfully validated the additional access token.

4. The overhead tracking system for tracking validation events of claim 1, wherein:
the at least one overhead tracking sensor is configured to detect when an additional one of the plurality of users has crossed into a feedback zone;
the one or more remote devices comprises a fare inspector device; and
the command comprises an indication that the additional one of the plurality of users has not successfully validated the access token from the fare media device associated with the additional one of the plurality of users.

5. The overhead tracking system for tracking validation events of claim 1, wherein:
the one or more remote devices comprises a fare access device; and
the command causes at least one component of the fare access device to change a physical state based on the particular one of the plurality of users having successfully validated the access token from the fare media device associated with the particular one of the plurality of users.

6. A method of tracking validation events, the method comprising:
detecting, using at least one overhead tracking sensor, a location of a feedback zone by detecting one or both of a predefined light signal or a predefined audio signal emitted by one or more signaling devices positioned proximate a boundary of the feedback zone;
capturing, using a facial recognition system, an image of a user associated with a specific access token having certain physical criteria associated therewith;
determining, using the facial recognition system, that the user associated with the specific access token does not have physical characteristics matching the physical criteria based on the captured image;
continuously tracking, using the at least one overhead tracking sensor, a position of each of a plurality of users passing underneath the at least one overhead tracking sensor;
receiving an indication from at least one of a plurality of validation devices that at least one of the plurality of users has successfully validated an access token from a fare media device associated with the at least one of the plurality of users;
detecting when a particular one of the plurality of users has crossed into the feedback zone, wherein the particular one of the plurality of users has attempted to validate using a mobile device associated with the particular one of the plurality of users, wherein the mobile device is used as the fare media device to provide a particular access token associated with the particular one of the plurality of users to one of the plurality of validation devices; and
sending a command to one or more remote devices based on detecting that the particular one of the plurality of users has crossed into the feedback zone, wherein one or both of a type of the command and the one or more remote devices are selected based on whether the particular one of the plurality of users has successfully validated the access token from the fare media device associated with the particular one of the plurality of users, wherein the one or more remote devices comprises the mobile device, and wherein the command comprises an indication that the particular one of the plurality of users has successfully validated the access token from the mobile device; and
sending a command to a mobile device of the user associated with the specific access token that the user associated with the specific access token has not been successfully validated based on the determination that the user associated with the specific access token does not physical characteristics matching the physical criteria associated with the specific access token.

7. The method of tracking validation events of claim 6, further comprising:

wirelessly receiving, at the at least one of the plurality of validation devices, the access token from the fare media device; and validating the access token.

8. The method of tracking validation events of claim 6, wherein:

the one or more remote devices comprises a fare access device; and the command causes at least one component of the fare access device to change a physical state based on the particular one of the plurality of users having successfully validated the access token from the fare media device associated with the particular one of the plurality of users.

9. The overhead tracking system for tracking validation events of claim 1, wherein:

the facial recognition system is integrated into each of the plurality of validation devices.

10. The method of tracking validation events of claim 6, wherein:

the facial recognition system is integrated into each of the plurality of validation devices.

\* \* \* \* \*